US007146307B2

(12) United States Patent
Mocek (10) Patent No.: US 7,146,307 B2
(45) Date of Patent: Dec. 5, 2006

(54) SYSTEM AND METHOD FOR TESTING TELEMATICS SOFTWARE

(75) Inventor: Darryl Mocek, San Jose, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 864 days.

(21) Appl. No.: 10/104,243

(22) Filed: Mar. 22, 2002

(65) Prior Publication Data

US 2003/0182577 A1 Sep. 25, 2003

(51) Int. Cl.
*G06F 9/455* (2006.01)

(52) U.S. Cl. ............................ 703/24; 703/23; 703/6; 703/7; 703/13; 701/1; 701/36; 701/48; 701/29

(58) Field of Classification Search ................. 703/6, 703/7, 8; 713/156; 710/72; 701/1–48; 700/48
See application file for complete search history.

(56) References Cited

U.S. PATENT DOCUMENTS

| 5,771,459 | A  | * | 6/1998  | Demery et al. ............. 455/517 |
|-----------|----|---|---------|-------------------------------------|
| 5,841,870 | A  | * | 11/1998 | Fieres et al. ................ 713/156 |
| 6,438,690 | B1 | * | 8/2002  | Patel et al. ................. 713/156 |
| 6,571,136 | B1 | * | 5/2003  | Staiger ........................ 700/48 |
| 6,615,186 | B1 | * | 9/2003  | Kolls ........................... 705/26 |
| 6,675,081 | B1 | * | 1/2004  | Shuman et al. ............... 701/48 |
| 6,772,248 | B1 | * | 8/2004  | McClure et al. ............. 710/72 |
| 6,839,710 | B1 | * | 1/2005  | Dabbish et al. ............. 380/255 |
| 6,928,344 | B1 | * | 8/2005  | McWalter et al. ........... 701/29 |
| 6,983,139 | B1 | * | 1/2006  | Dowling et al. ........ 455/414.2 |
| 7,039,511 | B1 | * | 5/2006  | Kreuz et al. .................. 701/36 |
| 2002/0198632 | A1 | * | 12/2002 | Breed et al. ................... 701/1 |
| 2003/0065432 | A1 | * | 4/2003  | Shuman et al. ............... 701/48 |
| 2003/0120395 | A1 | * | 6/2003  | Kacel ............................ 701/1 |
| 2003/0147534 | A1 | * | 8/2003  | Ablay et al. ................ 380/270 |
| 2003/0191568 | A1 | * | 10/2003 | Breed ........................... 701/36 |

OTHER PUBLICATIONS

"Java Telematics Technology", White Paper, Sun Microsystems, created: May 1997.*
"Position-Aware Ad hoc Wireless Networks for Inter-Vehicel Communication: the Fleetnet Project", Hartenstein et al, MobileHOC 2001, ACM 1-58113-390-1/01/10, ACM 2001.*
U.S. Appl. No. 10/104,267, filed Mar. 22, 2002, entitled "Adaptive Connection Routing Over Multiple Communicaton Channels".
U.S. Appl. No. 10/105,121, filed Mar. 22, 2002, entitled "Arbitration of Communication Channel Bandwidth".
U.S. Appl. No. 10/104,351, filed Mar. 2,2, 2002, entitled "System and Method for Distributed Prefernce Data Services".
U.S. Appl. No. 10/104,297, filed Mar. 22, 2002, entitled "Asynchronous Protocol Framework".

(Continued)

*Primary Examiner*—Fred Ferris
(74) *Attorney, Agent, or Firm*—Martine Penilla & Gencarella, LLP (57) ABSTRACT

A system and method of validating an application includes receiving the application and determining a set of accessed classes that are accessed by the application. The set of accessed classes are compared to a set of authorized classes to determine if one or more unauthorized classes are included in the set of accessed classes. And, validating only the applications that do not access unauthorized classes.

15 Claims, 8 Drawing Sheets

OTHER PUBLICATIONS

U.S. Appl. No. 10/104,298, filed Mar. 22, 2002, entitled "Business-Model Agnostic Service Deployment Management Service".

U.S. Appl. No. 10/104,295, filed Mar. 22, 2002, entitled Manager Level Device/Service Arbitrator.

U.S. Appl. No. 10/104,246, filed Mar. 22, 2002, entitled Java Telematics System Preferences.

U.S. Appl. No. 10/104,860, filed Mar. 22, 2002, entitled "System and Method for Simulating an Input to a Telematics System".

U.S. Appl. No. 10/104,294, filed Mar. 22, 2002, entitled "Java Telematics Emulator".

U.S. Appl. No. 10/104,245, filed Mar. 22, 2002, entitled "Abstract User Interface Manager With Prioritization".

* cited by examiner

SYSTEM AND METHOD FOR TESTING TELEMATICS SOFTWARE

CROSS REFERENCE TO RELATED APPLICATIONS

This application is related to (1) U.S. patent application Ser. No. 10/104,267, filed Mar. 22, 2002, and entitled "Adaptive Connection Routing Over Multiple Communication Channels," (2) U.S. patent application Ser. No. 10/105,121, filed Mar. 22, 2002, and entitled "Arbitration of Communication Channel Bandwidth," (3) U.S. patent application Ser. No. 10/104,351, filed Mar. 22, 2002, and entitled "System and Method for Distributed Preference Data Services," (4) U.S. patent application Ser. No. 10/104,297, filed Mar. 22, 2002, and entitled "Asynchronous Protocol Framework," (5) U.S. patent application Ser. No. 10/104,298, filed Mar. 22, 2002, and entitled "Business-Model Agnostic Service Deployment Management Service," (6) U.S. patent application Ser. No. 10/104,295, filed Mar. 22, 2002, and entitled "Manager Level Device/Service Arbitrator," (7) U.S. patent application Ser. No. 10/104,246, filed Mar. 22, 2002, and entitled "Java Telematics System Preferences," (8) U.S. patent application Ser. No. 10/104,860, filed Mar. 22, 2002, and entitled "System and Method for Simulating An Input To A Telematics System," (9) U.S. patent application Ser. No. 10/104,294, filed Mar. 22, 2002, and entitled "Java Telematics Emulator," and (10) U.S. patent application Ser. No. 10/104,245, filed Mar. 22, 2002, and entitled "Abstract User Interface Manager with Prioritization," which are incorporated herein by reference.

BACKGROUND OF THE INVENTION

1. Field of the Invention

The present invention relates generally to production, simulation and testing systems, and more particularly, to methods and systems for testing an application for a telematics system.

2. Description of the Related Art

The electronic content and sophistication of automotive designs has grown markedly. Microprocessors are prevalent in a growing array of automotive information, entertainment, safety and control functions. Consequently, this electronic content is playing an increasing role in the sales and revenues of the automakers. The features provided by the electronic content include audio systems, vehicle stability control, driver activated power train controls, adaptive cruise control, route mapping, collision warning systems, etc. The significant increase of the electronic content of land based vehicles has concomitantly occurred with the explosive growth of the Internet and the associated data driven applications supplied through mobile applications.

Telematics, a broad term that refers to vehicle-based wireless communication systems and information services, promises to combine vehicle safety, entertainment and convenience features through wireless access to distributed networks, such as the Internet. Telematics offers the promise to move away from the hardware-centric model from audio and vehicle control systems that are built into devices that are custom designed for each vehicle, to infotainment delivered by plug-and-play hardware whose functionality can be upgraded through software loads or simple module replacement. Furthermore, new revenue streams will be opened up to automobile manufacturers and service providers through the products and services made available through telematics.

Since these infotainment systems integrate entertainment and information within a common envelope, the systems need to be highly integrated, open and configurable. However, the electronic systems currently on the market are custom designed for the make, model, year and world region in which the vehicle is sold. Additionally, the electronic systems being used today are linked by proprietary busses having severely limited bandwidth that are inadequate for data-intensive services combining information entertainment and safety. The proprietary and customized systems require a developer to know the underlying software and hardware application program interfaces (APIs) in order to develop applications for future infotainment systems. However, numerous proprietary and customized systems are spread across the various makes and models of the vehicles in the marketplace and even within the same model from year to year. Thus, the heterogeneous nature of the various systems essentially eliminates any benefits of economies of scale since equipment and software must be tailored to each model permutation.

Furthermore, the embedded boards that are used by vehicle manufacturers are tied with respect to mission critical systems, however they are difficult to work with for a developer. More particularly, the developing and testing of an application that provides functionality for telematics systems associated with a vehicle is burdensome not only because of the heterogeneous nature of the multitude of embedded boards used, but also because of the configuration of embedded boards in general, i.e., limited memory, serial ports, etc., that require obtaining specialized hardware for a developer to work with the systems. It should be appreciated that since some of these boards are not equipped with local storage, the board must be coupled to a personal computer that has a special software program that can load the operating system over a network. Additionally, debugging the application on the board itself requires tying into a serial port of the board and reviewing generated text. These barriers would deter an independent developer from providing infotainment applications outside of the mission critical vehicle system applications provided by vehicle manufacturers. The embedded boards as described herein, include at least one microprocessor configured to execute the telematics applications.

A self-contained personal computer model, also referred to as the fat client model, has been proposed to provide a uniform standard across makes and models of vehicles. Here, the client performs the bulk of the data processing operations. However, there are a number of shortcomings of this model. For instance, the tightly coupled operating system/hardware architecture does not provide multi-platform support. Additionally, desktop operating systems are too general purpose and too large to fit in the restricted physical envelope of telematics devices. More importantly, the susceptibility to viruses and the general lack of security would be an unacceptable risk for the automobile manufacturer.

In view of the forgoing, there is a need for a system and method to encourage independent developers to develop and test applications for execution by a telematics control unit in order for a wide range of functionality to be made available to telematics consumers.

SUMMARY OF THE INVENTION

Broadly speaking, the present invention fills these needs by validating the software code used in a telematic system. It should be appreciated that the present invention can be implemented in numerous ways, including as a process, an apparatus, a system, computer readable media, or a device. Several inventive embodiments of the present invention are described below.

A system and method of validating an application includes receiving the application and determining a set of accessed classes that are accessed by the application. The set of accessed classes are compared to a set of authorized classes to determine if one or more unauthorized classes are included in the set of accessed classes.

The accessed unauthorized classes can also be identified in one embodiment.

If no unauthorized classes are accessed, then the application can be validated by adding a certificate. The certificate can include a validation checkbit, a validation flag or a security certificate. The certificate can also be encrytped.

In one embodiment, a telematics control unit can interrogate the application for a valid certificate. If the application does not have a valid certificate, then the TCU can disable the application or refuse to install or start the application.

In another embodiment, a carlet can be validated by checking the carlet, validating the carlet if the carlet is valid, and activating the valid carlet. Checking the carlet can include determining the accessed classes that are accessed by the carlet and comparing the accessed classes to a set of authorized classes. Unauthorized classes included in the accessed classes are determined. In one embodiment, a carlet is valid if no unauthorized classes are included in the accessed classes. In one embodiment validating the carlet includes adding a certificate to the carlet.

A validated application allows a vehicle manufacturer to limit the classes that an application can access. This provides the vehicle manufacturer with a method to safeguard portions of the telematics system such as the safety and the security components and devices in the vehicle from unauthorized use.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

The embodiments of the invention described herein provide a software application testing system, which is a component of a development toolkit for the telematics system. As will be explained in more detail below, the client side of the telematics system includes a telematics control unit (TCU) that ties into the vehicle systems. In one embodiment, the TCU is associated with a user interface (UI) that provides a user with access to control options. It should be appreciated that the user can interact with the TCU through speech recognition, a mouse type device, touch pad or some other suitable mechanism, which has a minimal impact on the driver's ability to drive. Of course, a passenger of the vehicle is not limited by the restrictions on the driver with respect to the interaction with the UI.

The TCU can tie into any of the control systems, safety systems, entertainment systems, information systems, security systems, etc., of the vehicle. It will be apparent to one skilled in the art that the client side stack of the TCU is utilized to access a vehicle interface component for accessing in-vehicle devices and components, such as the speedometer, revolutions per minute (rpm) indicator (tachometer), oil pressure sensor, tire pressure sensor, etc. Thus, client side applications sitting in the TCU will allow for the functionality with respect to the vehicle systems as well as infotainment applications.

The development toolkit allows accessibility for software developers without the need for the developer to directly interface with the microprocessor of the embedded board. The developers of the client applications can develop and test the applications through the emulation, simulation and code checker software which can be downloaded to a developer's personal computer workstation.

In one embodiment, the telematics system deploys Java technology. It should be appreciated that Java technology's platform-independence and superior security model provide a cross-platform solution for the heterogeneous systems of a vehicle while maintaining a security architecture protecting against viruses and unauthorized access. Thus, the content or service provider is insulated against the myriad of car platforms while vehicle manufacturers are protected against hacker threats. In addition, Java application program interfaces (APIs) are available to support telematics mediums, such as speech recognition through Java Speech API (JSAPI), media delivery through Java Media Framework (JMF) and wireless telephony through Wireless telephony communications APIs (WTCA), etc.

One aspect of the development process which is addressed by the development toolkit is the emulation of the user interface of the TCU which may include a display screen, controls, speech interface, etc. while the simulator simulates vehicle devices and components. Therefore, the developer can emulate the screen and controls in order to create applications in an abstract mode without the need to have access to the embedded board or vehicle. In one embodiment of the invention, the developer has access to different configurations of the TCU so that client applications can be developed irrespective of the model of the TCU or for that matter the model of the vehicle. That is, the emulator allows the developer to write client applications for a TCU on a standard personal computer readily available in the market place. Furthermore, the emulator allows a developer to have a high level of confidence that the client application will behave the same when the application is deployed in the vehicle as it does on the emulator.

Another aspect of the development process, which is addressed by the development toolkit, is the simulation of the components in the vehicle that will communicate with the TCU. Therefore, the developer can simulate the vehicle component in order to test create applications in an abstract mode without the need to have access to the actual components in the vehicle. The component simulations may be run and manipulated on the developer's workstation and in communication with an actual or emulate TCU via a connection. The component simulator allows the developer to test the function of a carlet without the need of manipulating actual components of the vehicle. For example, if the developer wished to simulate the vehicle moving 130 MPH, then the developer can simulate a speedometer indicating 130 MPH and couple the output of the simulated speedometer to the TCU. Such as simulation is much easier and safer than actually driving the vehicle with the TCU installed in it to 130 MPH.

Another aspect of the development process, which is addressed by the development toolkit, is the code checker. The code checker checks the applications, such as a carlet, developed by the developer to ensure the application does not access or interfere with restricted portions of the telematics client stacks or gain access to restricted server applications or classes. In one embodiment, the code checker checks the classes and methods that are utilized by the application (e.g., a carlet) against a list of classes and methods available on the TCU. The applications may be restricted from using certain classes and methods available on the TCU due to safety, security, reliability, resource allocation and other reasons. Additionally, the code checker may also add a certificate to the application that certifies the application passed or been certified by the code checker. The certificate can also be encoded. As used herein a certificate can include any method of flagging or encrypting or otherwise identifying the application that has been approved by the code checker and is thereby able to safe to be used.

Figure 1:
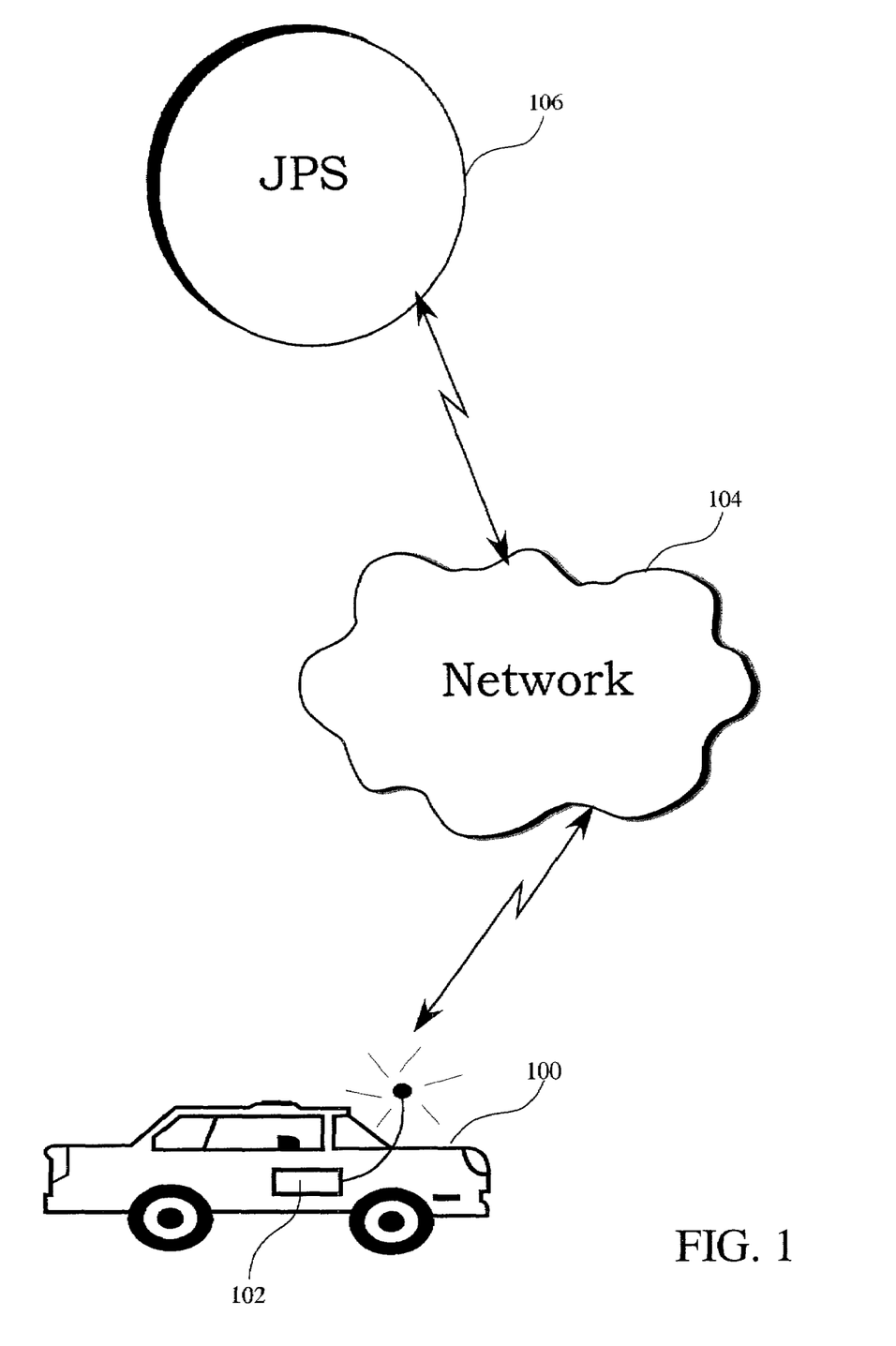
FIG. 1 is a high level schematic overview of an automotive telematics system in accordance with one embodiment of the invention.

FIG. 1 is a high level schematic overview of an automotive telematics system in accordance with one embodiment of the invention. A client/server architecture relying on standards and principles of modular design allows for functionality of the telematics system to be delivered to the customer through wireless access. The server side includes Java provisioning server (JPS) 106 in communication with network 104.

For a detailed description of JPS 106, reference may be made to U.S. patent application Ser. No. 10/104,297 entitled "Asynchronous Protocol Framework," and having inventors Peter Strarup Jensen, Pavel S. Veselov, Shivakumar S. Govindarajapuram, and Shahriar Vaghar, assigned to the assignee of the present application, and which is hereby incorporated by reference.

The client side includes telematics control unit (TCU) 102 contained within the body a vehicle 100. TCU 102 is enabled to communicate with network 104 through wireless access. Of course, network 104 can be any distributed network such as the Internet and the wireless access protocol (WAP) can be any suitable protocol for providing sufficient bandwidth for TCU 102 to communicate with the network. It should be appreciated that the client/server architecture of FIG. 1 allows for the evolution from hard wired, self contained components to platform based offerings relying on software and upgrades. Thus, a service provider controlling JPS 106 can deliver an unbundled, open end-to-end solution enabling plug and play applications. For example, the service can be a tier-based service similar to home satellite and cable services. It will be apparent to one skilled in the art that an open platform, such as frameworks based on Java technology, enables a developer to create executable applications without regard to the underlying hardware or operating system.

Figure 2:
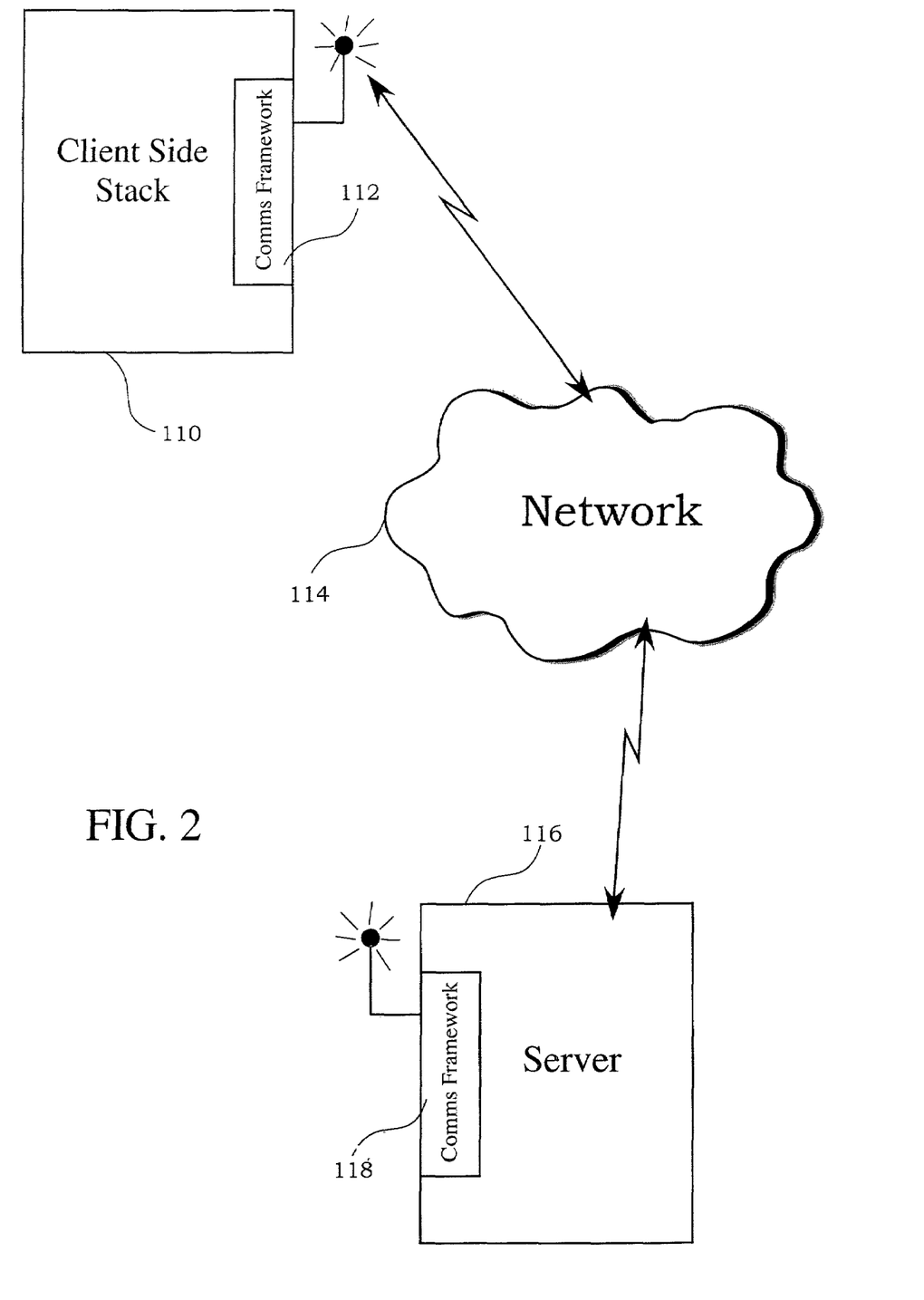
FIG. 2 is a schematic diagram of a telematics client communicating through a wireless network with a telematics server in accordance with one embodiment of the invention.

FIG. 2 is a schematic diagram of a telematics client communicating through a wireless network with a telematics server in accordance with one embodiment of the invention. Client side stack 110 includes the necessary layers for a client application, also referred to as a manager or a carlet, to be executed to provide functionality. As will be explained further below, the carlet has access to each layer of the client side stack 110. Included in client side stack 110 is client communication framework 112. Client communication framework 112 enables communication between the client side stack 110 and an application on server 116 through network 114. It should be appreciated that server 116 is not limited to a wireless connection. For example, server 116 can be hard-wired into network 114. One skilled in the art will appreciate that where server 116 communicates through a wireless connection with network 114, the communication proceeds through server communication framework 118. With respect to an embodiment where server 116 is hard-wired to network 114, the server can communicate with network 114 through a network portal (e.g., the Internet) rather than server communication framework 118. Additionally, network 114 can be any suitable distributed network, such as the Internet, a local area network (LAN), metropolitan area network (MAN), wide area network (WAN), etc.

Figure 3:
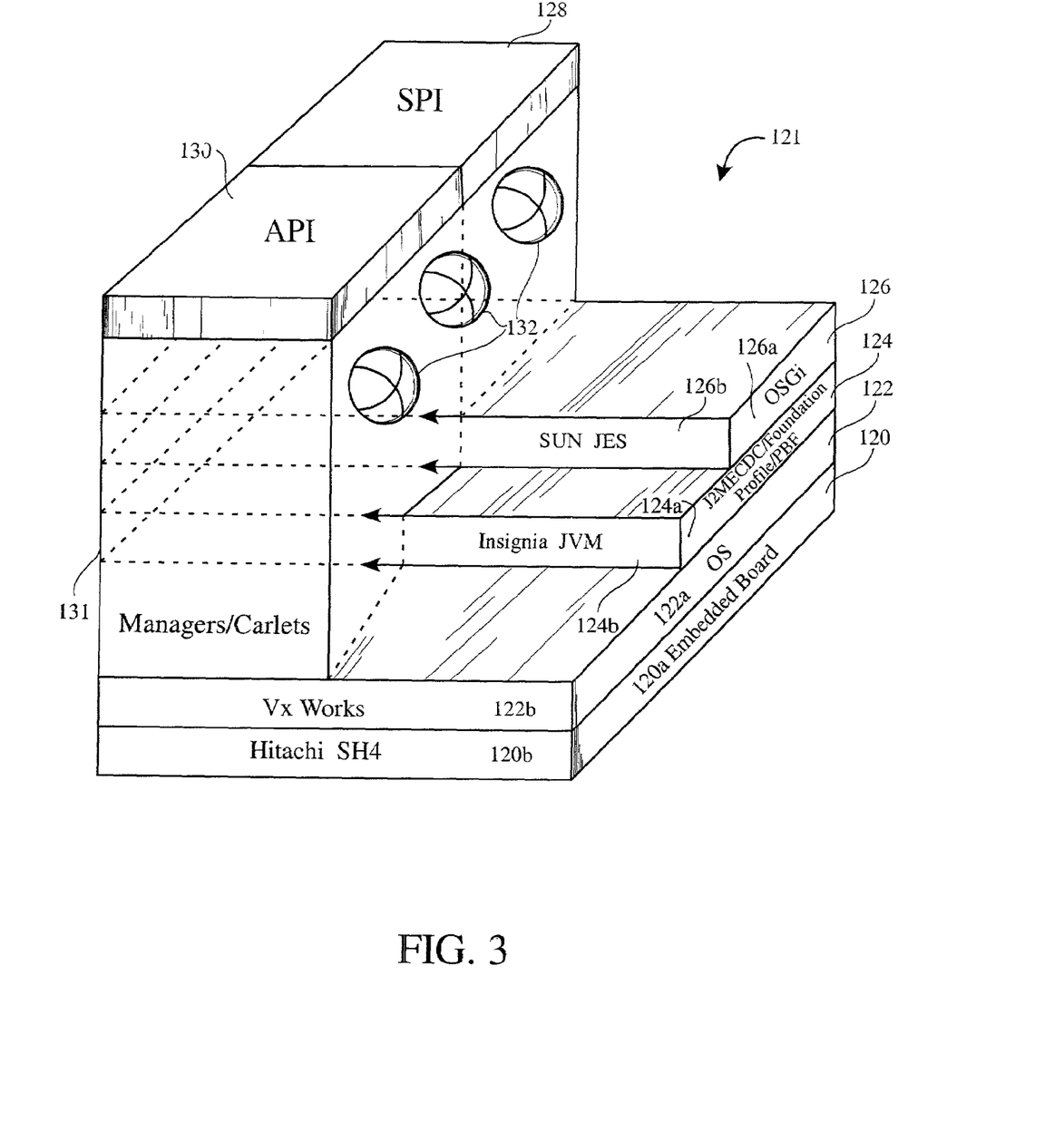
FIG. 3 is a three dimensional pictorial representation of a telematics client implementation of the client side stack of FIG. 2 in accordance with one embodiment of the invention.

FIG. 3 is a three dimensional pictorial representation of a telematics client implementation of the client side stack of FIG. 2 in accordance with one embodiment of the invention. Client side implementation 121 includes hardware layer 120 of the client includes an embedded board containing a telematics control unit (TCU). As mentioned with reference to FIG. 1, the TCU is incorporated into a vehicle. In one embodiment, the TCU is in communication with the electronic components of a vehicle through a vehicle bus. Alternatively, the TCU can communicate with electronic components of a vehicle through any available communication method such as wireless communication method (e.g., cellular, 802.11 wireless networking, Bluetooth, RFID systems, etc.), direct electrical connection that is separate or even combined with the vehicle bus. These components include the measurement of vehicle operating and safety parameters, such as tire pressure, speed, oil pressure, engine temperature, etc., as well as information and entertainment components, such as audio system settings, Internet access, environmental control within the cabin of the vehicle, seat positions, etc. One skilled in the art will appreciate that the telematics control unit is capable of integrating the functionality of various handheld information and entertainment (infotainment) devices, such as mobile phones, personal digital assistants (PDA), mp3 players, etc.

Still referring to FIG. 3, operating system layer 122 sits above hardware layer 120. Java virtual machine (JVM) layer 124 sits on top of operating system (OS) layer 122 and open services gateway initiative (OSGI) layer 126 sits on top of the JVM layer. It should be appreciated that the standard for JVM layer 124 includes Java 2 Platform Micro Edition (J2ME), Connected Device Configuration (CDC) or a Connected Limited Device Configuration (CLDC), Foundation Profile, Personal Profile or Personal Basis Profile. One skilled in the art will appreciate that J2ME Foundation Profile is a set of APIs meant for applications running on small devices that have some type of network connection, while J2ME CDC Personal Profile or Personal Basis Profile provides the J2ME CDC environment for those devices with a need for a high degree of Internet connectivity and web fidelity. The standards for each of the layers of the stack are provided on the right side of client side reference implementation 121. In particular, OSGI 126a, J2ME CDC 124a, OS 122a, and embedded board 120a are standards and to the left of the standards are examples of actual products that implement the standards. For example, OSGI 126a standard is implemented by Sun's Java Embedded Server (JES) 2.1 126b, J2ME 124a standard is implemented by Insignia's Virtual Machine 124b, OS 122a is implemented by Wind River's VxWorks real time operating system 122b, and embedded board 120a is an embedded personal computer based board such as Hitachi's SH4. It should be appreciated that the actual products are exemplary only and not meant to be limiting as any suitable product implementing the standards can be utilized.

One embodiment of a telematics client 131 includes the carlets 132, an application program interface (API) 130 and service provider interface (SPI) layer 128. Carlets 132 of FIG. 3 have access to each layer above and including OS layer 122. Application program interface (API) layer 130 is the layer that carlets use to communicate with the JTC. Service provider interface (SPI) layer 128 is a private interface that managers have among each other. One skilled in the art will appreciate OSGI layer 126 provides a framework upon which applications can run. Additional functionality over and above the JVM, such as lifecycle management, is provided by OSGI layer 126. It should be appreciated that the open services gateway initiative is a cross-industry working group defining a set of open APIs for a service gateway for a telematics system. These APIs consist of a set of core framework APIs. In order to deploy services and their implementations, OSGI defines a packaging unit called a service bundle. A service bundle is a Java Archive (JAR) file containing a set of service definitions along with their corresponding implementation. Both infrastructure services and carlets are deployed as service bundles. Some of the functionality for arbitrating, controlling and managing devices and resources, e.g., speakers cell phones, etc., is provided by OSGI layer 126. However, one skilled in the art will appreciate that separate arbitration services may also be required.

As used herein, a carlet is a Java™ application. In an alternative embodiment, the carlet may not be limited to being a Java™ application. For each function or task to be processed on the client side or between the client and server sides, a carlet is invoked to manage the operation. In this manner, carlets can be independently written, tested, and launched for use on a telematics system. By way of example, a carlet can be written to control or monitor the activity of automobile components (e.g., tires, engine oil, wiper activity, steering tightness, maintenance recommendations, air bag control, transmission control, etc.), and to control or monitor applications to be processed by the telematics control unit (TCU) and interacted with using the on-board automobile monitor. As such, specialized carlets can be written to control the audio system, entertainment modules (e.g., such as on-line games or movies), voice recognition, telecommunications, email communications (text and voice driven), etc. Accordingly, the type of carlets that can be written is unlimited.

Figure 4:
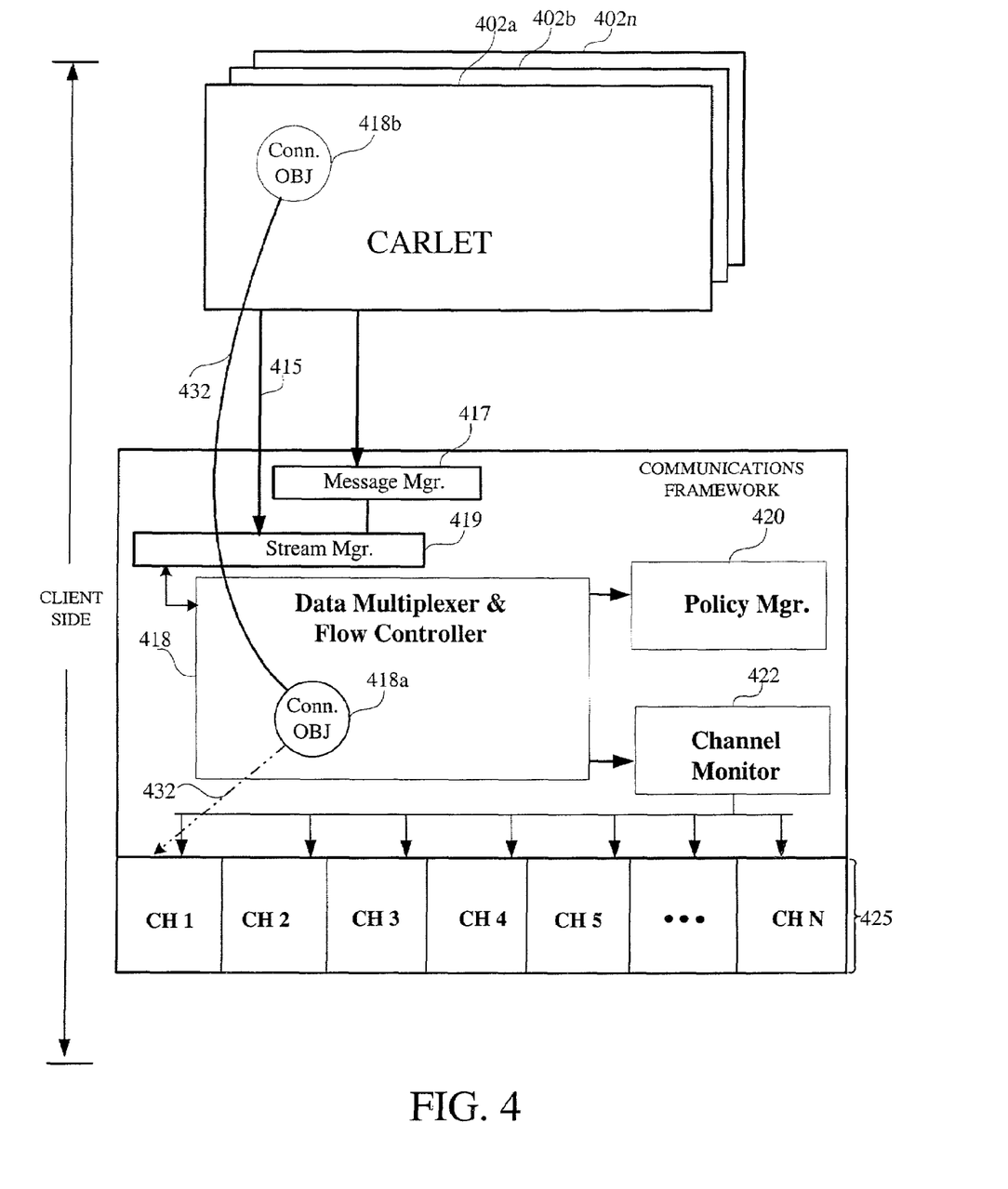
FIG. 4 is a high level schematic diagram of the interaction between a carlet and a communications framework on the client side of a telematics system in accordance with one embodiment of the invention.

FIG. 4 is a high level schematic diagram of the interaction between a carlet and a communications framework on the client side of a telematics system in accordance with one embodiment of the invention. It should be appreciated that the server side has a similar communication framework to establish and enable synchronous communication between the client side (e.g., a telematics control unit on a vehicle) and the server side (e.g., a Java telematics server). The communications framework 416 includes a message manager 417, a stream manager 419, a data multiplexer and flow controller 418, a policy manager 420, a channel monitor 422, and an interface to the various physical channels available to the communications framework of the client side.

Still referring to FIG. 4, when a particular carlet application 402 is requested, the carlet will communicates with the stream manager 419 and request that a connection be established. In response, the stream manager 419 will request a connection object (Conn. OBJ) 418a from the data multiplexer and flow controller 418. Once a channel satisfying the request is available, the data multiplexer and flow controller 418 will return a connection object (Conn. OBJ) 418b back to the carlet. Thus, a communication link is established between the carlet application 402 via the connection objects 418a and 418b of the data multiplexer and flow controller 418. In one embodiment, the connection object 418a of the data multiplexer and flow controller 418 has the ability to switch between channels 425 that are available to the communications framework 416a of the client side. Here, code contained in the policy manager enables selection of different channels depending upon availability, the type of communication desired, bandwidth requirements for a given data transfer or transfers, payment of a bandwidth fee, subscription level, etc.

The telematics system, by design, has access to many the functions and components of the vehicle. For example a telematics system can access and control the safety and the security systems in the vehicle. The telematics system can also impact the reliability of the vehicle. All of the above issues give rise to potential liability concerns of the vehicle manufacturer. By way of example, an unauthorized person could access to the vehicle security systems via the telematics system and thereby unlock and steal the vehicle. In addition, an unauthorized person can access the safety systems, such as the antilock braking system or the passive restraint (air bag) systems such that the systems malfunction when needed and thereby cause more severe injuries and damage. Such unauthorized access could expose the vehicle manufacturer excessive liabilities.

Therefore, it is an important consideration to limit access to the vehicle through the telematics system. However, the telematics system must also be accessible enough to foster development of applications for the telematics system. Neither a typical telematics operating system (OS), nor the Java™ virtual machine (JVM) can easily limit the scope and reach of applications such as the carlets. However, the scope and reach of the carlets must be limited.

Figure 5A:
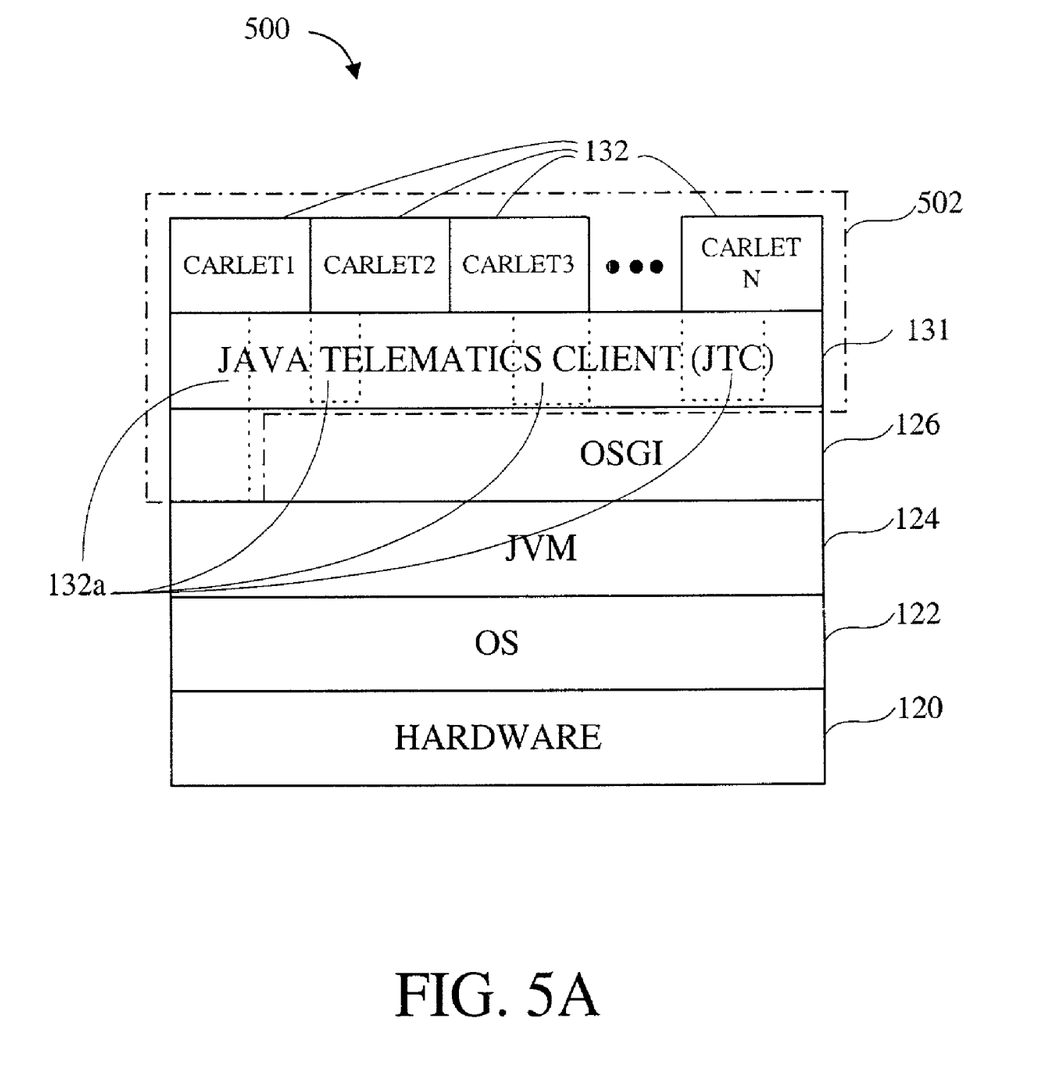
FIG. 5A is a block diagram of the in-vehicle telematics system, in accordance with one embodiment of the present invention.

In one embodiment, the scope and reach of the implementation, such as the carlets, are limited to only a selected group of authorized classes. FIG. 5A is a block diagram of the in-vehicle telematics system 500, in accordance with one embodiment of the present invention. The hardware 120, the OS 122, the JVM 124, the OSGI 126, the JTC 131 and the carlets 132 were discussed in some detail in FIG. 3 above.

A carlet 132 can access the OS 122, the JVM 124, the OSGI 126 and the JTC 131. However, for various reasons it may be desirable to limit a carlet's access to only the JTC 131, the OSGI 126, and the JVM 124 as shown by the extensions 132A of the carlets 132 which are shown in phantom extending into and through the JTC 131 and the OSGI 126. A portion 502 of the in-vehicle telematics client 500 represents the portions of the in-vehicle telematics client 500 that a carlet developer is authorized to access. In one embodiment, the carlet developer is not authorized to directly access the hardware 120 or the OS 122 and the carlet developer is authorized to directly access the carlets 132, the JTC 131 and a limited portion of the OSGI 126. Alternatively, based on the requirements of other parties (e.g., the vehicle manufacturer) the carlet developer may be required to further limit the scope and reach of a carlet or even extend the scope and reach of a carlet (i.e., expand or contract the specific portion 502 of the in-vehicle telematics client 500).

Figure 5B:
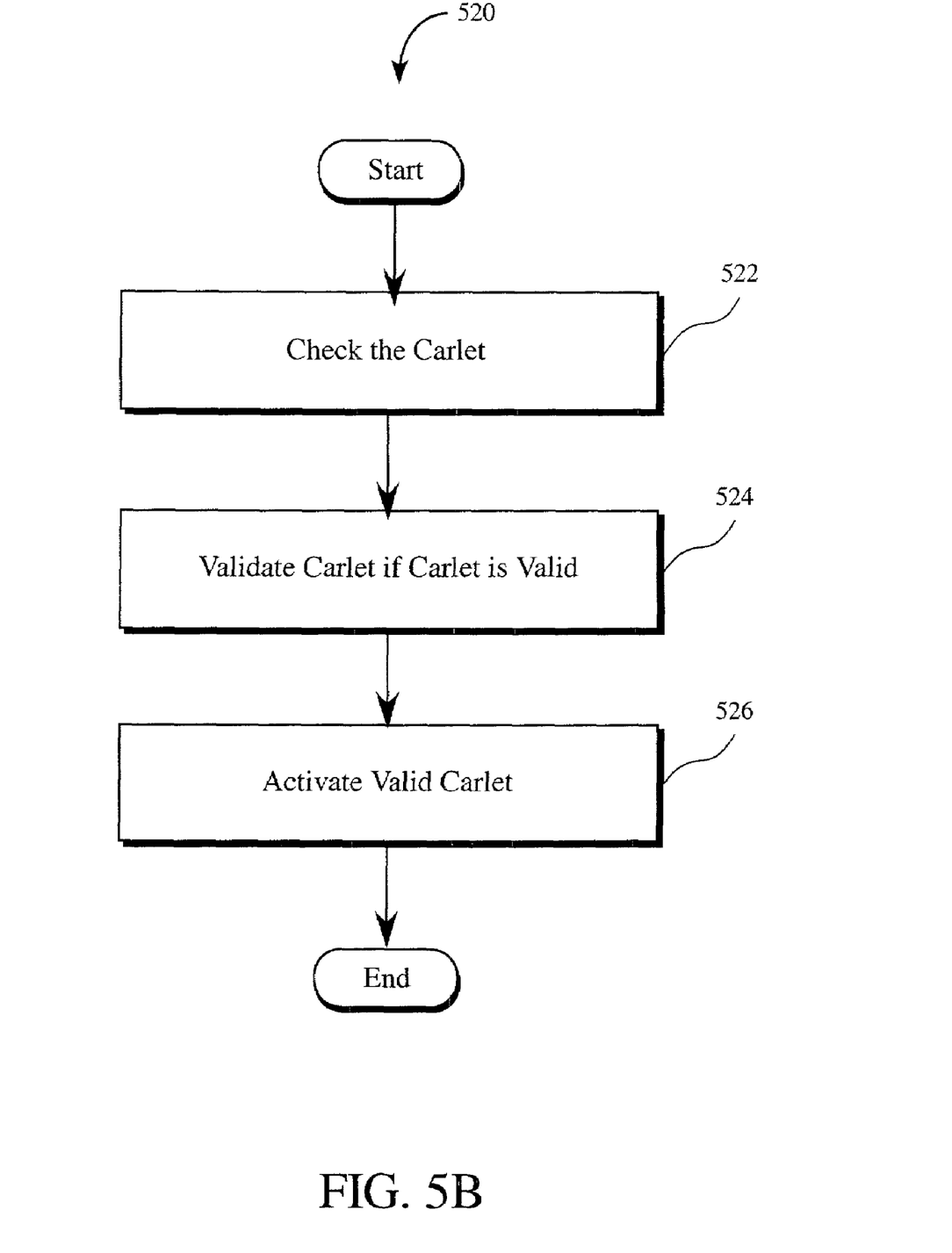
FIG. 5B is a flowchart of the method operations of validating a carlet.

According to one embodiment a carlet must be validated before the carlet can be used in the in-vehicle telematics system 500. FIG. 5B is a flowchart of the method operations of validating a carlet 520. In an operation 522 the carlet is checked. In operation 524, the carlet is validated if the carlet is valid. In operation 526, a valid carlet will be allowed to be activated. In alternative embodiment, only a valid carlet will be allowed to be installed.

Figure 6:
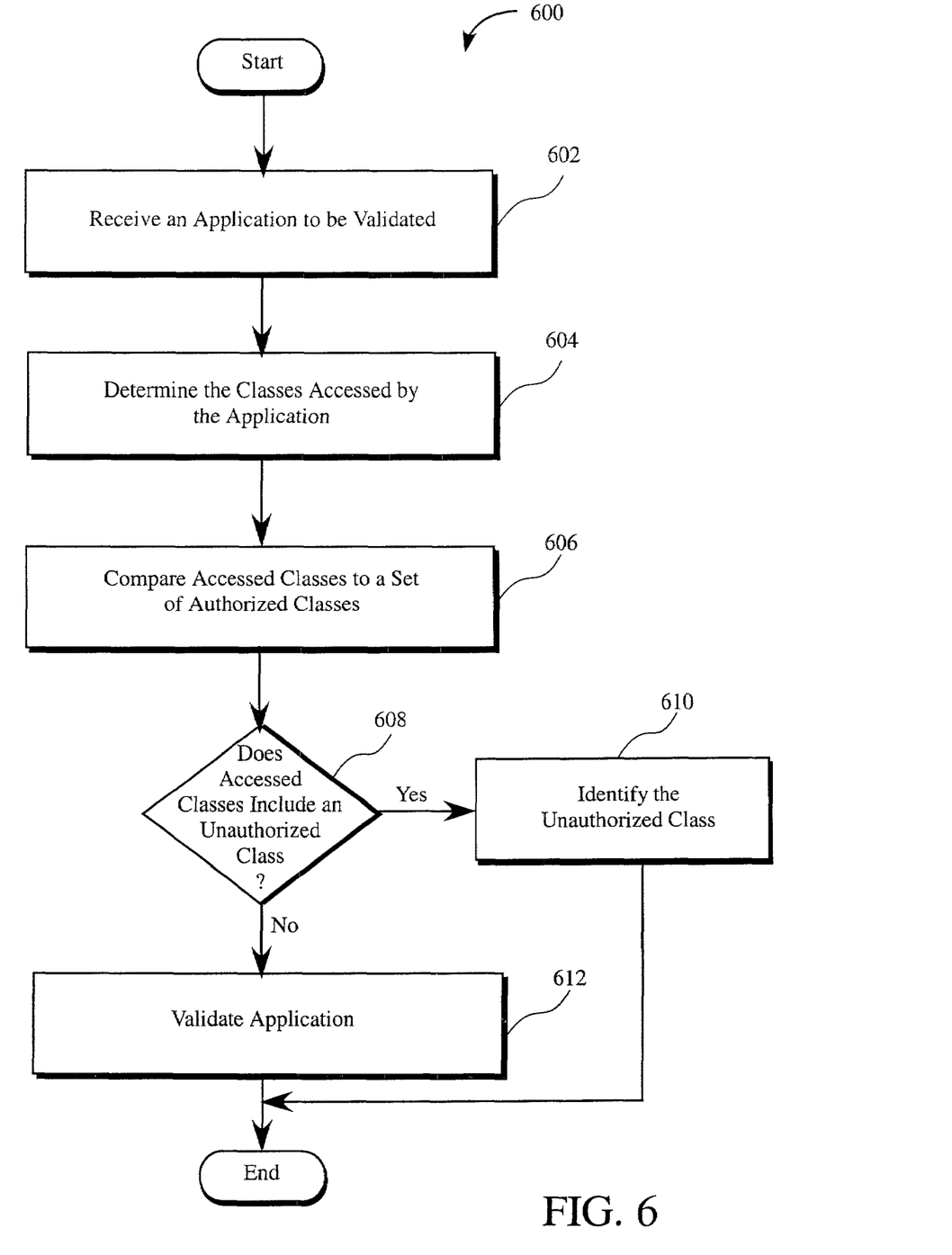
FIG. 6 is a flowchart of the method operations of validating an application such as a carlet in accordance with one embodiment of the present invention.

FIG. 6 is a flowchart of the method operations of validating 600 an application such as a carlet in accordance with one embodiment of the present invention. In operation 602, the application to be validated is received. In operation 604, the classes accessed by the application are determined. In one embodiment, the application is written in Java™ or another object oriented programming language. A Java™ application (e.g., implementation) can include a specification. The specification is typically a list of all of the classes used by the application and all the interrelationships of the classes. Therefore the specification of the application can be used to determine the classes accessed by the application. In one embodiment, the specification may be certified to ensure that all of the classes asserted (i.e., assertions) by the application are included in the specification. Other methods can also be used to determine the classes accessed by the application including a functional test of the application.

Once the classes accessed by the application are determined in operation 604, the list of accessed classes is compared to a list of authorized classes in operation 606. In decision operation 608, if the accessed classes include any classes that are not authorized (i.e., unauthorized classes), then the application fails validation and must be modified and then reevaluated for validation. In one embodiment, the if the accessed classes include any unauthorized classes, then the unauthorized classes can be identified in operation 610. If in operation 608, the accessed classes do not include any unauthorized classes, then the operation proceeds to operation 612 where the application is validated and the operation ends.

The application may be validated in any one or more of a number of methods. In one embodiment, setting a validation "flag" within the application to a "valid" status can validate the application. Alternatively, a checkbit such as a cyclic redundancy code (CRC) or other types of checkbits can be included in the application. The validation can also be encrypted into the application. A private key or other decryption method may be required to determine whether an application has been validated.

Figure 7:
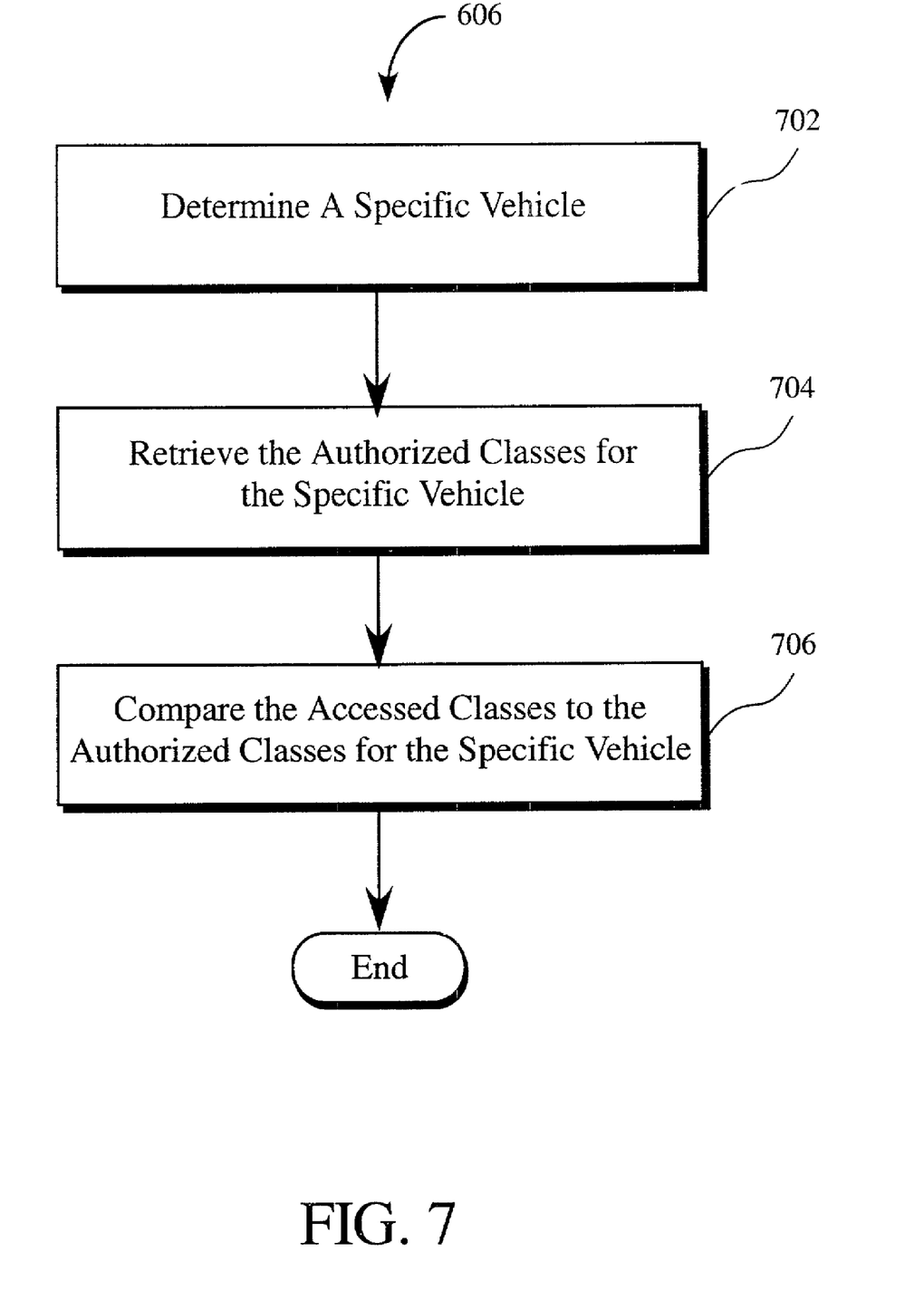
FIG. 7 is a flowchart of the method operations of comparing accessed classes to a set of authorized classes such as in FIG. 6 above, in accordance with one embodiment of the present invention.

Each specific vehicle model may have a different requirements and uses for the in-vehicle telematics client 500 and therefore each vehicle may have a lesser or greater number of authorized classes that the application may be allowed to access. FIG. 7 is a flowchart of the method operations of comparing accessed classes to a set of authorized classes such as in operation 606 of FIG. 6 above, in accordance with one embodiment of the present invention. In operation 702, the specific, intended vehicle is determined. In one embodiment, the developer may enter a vehicle or another identifier to identify the specific intended vehicle.

In operation 704, the authorized classes for the specific vehicle are retrieved. In one embodiment, the authorized classes may be accessible from a manufacturer's database or a via a trusted clearinghouse type of source. The accessed classes are then compared to the authorized classes for the specific vehicle in operation 706.

In one embodiment, the application validation method operations described in FIGS. 5A–7 above may be applied as part of a testing function of the application by the application developer. Alternatively, the application validation can be conducted by a trusted third-party validator. A vehicle manufacturer may also conduct the validation.

Referring again to FIG. 5A above, in one embodiment, the in-vehicle telematics client 500 can check the validation status of the application before allowing the application to activate. In another embodiment, the in-vehicle telematics client 500 can perform a continuous validation monitoring of each of the carlets 132 that have been activated.

While described above in regard to the in-vehicle telematics client 500, in one embodiment, the application validation methods described herein can applied to the server applications in the JPS.

As used herein a carlet is a Java application. For each function or task to be processed on the client side or between the client and server sides, a carlet is invoked to manage the operation. In this manner, carlets can be independently written, tested, and launched for use on a telematics system. By way of example, a carlet can be written to control or monitor the activity of automobile componenets (e.g., tires, engine oil, wiper activity, steering tightness, maintenance recommendations, air bag control, transmission control, etc.). A carlet can be written to control or monitor applications to be processed by the telematics control unit (TCU) and interacted with using the on-board automobile monitor. As such, specialized carlets can be written to control the audio system, entertainment modules, such as on line games or movies, voice recognition, telecommunications, email communications (text and voice driven), etc. Accordingly, the type of carlets that can be written is unlimited. Carlets may be pre-installed or downloaded from a server. A carlet may or may not have an API which may be invoked by other carlets. The carlet may or may not have running threads of its own.

In practice, system carlets most likely will be written by the automobile manufacturer, a Tier 1 supplier (e.g., a supplier that supplies components to a vehicle manufacturer) or a service provider who will be most knowledgeable of critical vehicle component operation, while non-vehicle system carlets can be written by independent software companies. Each carlet may therefore, in one embodiment, be associated with a set of properties. These properties, among other things, will dictate what minimum level of bandwidth should be provided by the communications framework.

As an overview, the Java virtual machine (JVM) is used as an interpreter to provide portability to Java applications. In general, developers design Java applications as hardware independent software modules, which are executed on Java virtual machines. The Java virtual machine layer is developed to operate in conjunction with the native operating system of the particular hardware on which the communications framework 416c is to run. In this manner, Java applications (e.g., carlets) can be ported from one hardware device to another without requiring updating of the application code.

Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "bytecode". The bytecode is then converted (interpreted) into machine code at runtime. Upon finding a Java applet, the Web browser invokes a Java interpreter (Java Virtual Machine), which translates the bytecode into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Although the present invention is described based on the Java programming language, other programming languages may be used to implement the embodiments of the present invention, such as other object oriented programming languages. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Furthermore the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the TCU discussed above, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data that can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the operations in FIGS. 5B–7 are not required to be performed in the order illustrated, and that all the processing represented by the operations may not be necessary to practice the invention. Further, the processes described in FIGS. 5B–7 can also be implemented in software stored in any one of or combinations of the electronic data storage known in the art.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of validating an application comprising:
   receiving an application in a code checker included in a computer implementing a telematics application development tool kit;
   determining a plurality of accessed classes that are accessed by the application with the development tool kit;
   comparing the plurality of accessed classes to a plurality of authorized classes identified in the development tool kit;
   determining if one or more unauthorized classes are included in the plurality of accessed classes;
   adding a certificate to the application if no unauthorized classes are included in the plurality of accessed classes;
   receiving the application in a telematics control Unit (TCU) in a vehicle; and
   executing the application in the TCU, if the TCU detects a certificate in the application including:
     installing the application in the TCU; and
     activating the application in the TCU.

2. The method of claim 1, wherein if one or more unauthorized classes are included in the plurality of accessed classes then the one or more unauthorized classes are identified.

3. The method of claim 1, wherein the certificate is encrypted.

4. The method of claim 1, wherein the certificate includes a checkbit.

5. The method of claim 1, wherein comparing the plurality of accessed classes to the plurality of authorized classes includes:
   determining a specific vehicle that the application is intended for;
   retrieving a plurality of vehicle specific authorized classes; and
   comparing the plurality of accessed classes to the plurality of vehicle specific authorized classes.

6. A method of validating a carlet comprising:
   receiving the carlet in a code checker included in a computer implementing a telematics application development tool kit;
   checking the carlet in the code checker;
   validating the carlet if the carlet is valid;
   receiving the valid carlet in a telematics client in a telematics control unit in a vehicle;
   activating the valid carlet including:
     installing the carlet in the TCU; and
     activating the carlet in the TCU.

7. The method of claim 6, wherein checking the carlet includes:
   determining a plurality of accessed classes that are accessed by the carlet;
   comparing the plurality of accessed classes to a plurality of authorized classes; and
   determining if one or more unauthorized classes are included in the plurality of accessed classes.

8. The method of claim 7, wherein the carlet is valid if no unauthorized classes are included in the plurality of accessed classes.

9. The method of claim 6, wherein the valid carlet includes a certificate.

10. A system for validating an application comprising:
    a processor;
    a storage facility coupled to the processor and containing instructions executable by the processor which configure the system to:
      receive an application in a code checker included in a computer implementing a telematics application development tool kit;
      determine a plurality of accessed classes that are accessed by the application with the development tool kit;
      compare the plurality of accessed classes to a plurality of authorized classes identified in the development tool kit;
      determine if one or more unauthorized classes are included in the plurality of accessed classes;
      add a certificate to the application if no unauthorized classes are included in the plurality of accessed classes;
      receive the application in a telematics control Unit (TCU) in a vehicle; and
      execute the application in the TCU, if the TCU detects a certificate in the application including:
        installing the application in the TCU; and
        activating the application in the TCU.

11. The system of claim 10, further comprising instructions executable by the processor which configure the system to:
    identify one or more unauthorized classes if the one or more unauthorized classes are included in the plurality of accessed classes.

12. The system of claim 10, further comprising instructions executable by the processor which configure the system to:
    execute the application in a TCU, wherein the TCU interrogates the certificate such that if the certificate is not valid then the application is disabled.

13. The system of claim 10, further comprising instructions executable by the processor which configure the system to encrypt the certificate.

14. The system of claim 10, wherein the certificate includes a checkbit.

15. The system of claim 10, wherein the instruction to compare the plurality of accessed classes to a plurality of authorized classes includes instructions executable by the processor which configure the system to:

determine a specific vehicle that the application is intended for;
retrieve a plurality of vehicle specific authorized classes; and
compare the plurality of accessed classes to the plurality of vehicle specific authorized classes.

* * * * *